US012149451B2

(12) United States Patent
Varga et al.

(10) Patent No.: US 12,149,451 B2
(45) Date of Patent: Nov. 19, 2024

(54) AVOIDING JITTER IN A COMMUNICATION SYSTEM

(71) Applicant: Telefonaktiebolaget LM Ericsson (publ), Stockholm (SE)

(72) Inventors: Balázs Varga, Budapest (HU); János Farkas, Kecskemét (HU); György Miklós, Pilisborosjenö (HU); János Harmatos, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 540 days.

(21) Appl. No.: 17/613,849

(22) PCT Filed: Apr. 9, 2020

(86) PCT No.: PCT/EP2020/060281
§ 371 (c)(1),
(2) Date: Nov. 23, 2021

(87) PCT Pub. No.: WO2020/239313
PCT Pub. Date: Dec. 3, 2020

(65) Prior Publication Data
US 2022/0239600 A1 Jul. 28, 2022

Related U.S. Application Data

(60) Provisional application No. 62/853,827, filed on May 29, 2019.

(51) Int. Cl.
*H04L 47/283* (2022.01)
*H04L 47/2416* (2022.01)
(Continued)

(52) U.S. Cl.
CPC ........ *H04L 47/283* (2013.01); *H04L 47/2416* (2013.01); *H04L 47/32* (2013.01); *H04L 47/826* (2013.01)

(58) Field of Classification Search
None
See application file for complete search history.

(56) References Cited

U.S. PATENT DOCUMENTS 8,811,410 B1 * 8/2014 Jain ........................ H04J 3/0682
370/252
10,129,160 B2 * 11/2018 Puleri ................. H04L 47/2441
(Continued)

OTHER PUBLICATIONS

Nokia, Nokia Shanghai Bell, "TSN performance requirements evaluation", 3GPP TSG-RAN WG2 Meeting #103bis, Chengdu, China, Oct. 8-12, 2018, R2-1814992, 9 Pages. (Year: 2018).*
(Continued)

*Primary Examiner* — Liem H. Nguyen
(74) *Attorney, Agent, or Firm* — Rothwell, Figg, Ernst & Manbeck, P.C.

(57) ABSTRACT

Avoiding jitter in a communication network. A method for avoiding jitter includes receiving, an ingress point of the communication network, a packet, wherein the packet is received at the ingress point at a time within a particular time slot. The method also includes the ingress point creating a modified packet that includes the received packet and a slot identifier indicating the particular time slot in which the packet was received, the ingress point transmitting (s406) the modified packet towards an egress point of the communication network.

19 Claims, 10 Drawing Sheets

(51) Int. Cl.
   *H04L 47/32*      (2022.01)
   *H04L 47/70*      (2022.01)

(56) References Cited

U.S. PATENT DOCUMENTS

| | | | |
|---|---|---|---|
| 2010/0034212 A1* | 2/2010 | Yavuz | H04W 8/04 |
| | | | 370/412 |
| 2021/0250787 A1* | 8/2021 | Kolding | H04L 47/283 |
| 2022/0014485 A1* | 1/2022 | Pocovi | H04L 1/187 |

OTHER PUBLICATIONS

International Search Report and Written Opinion issued in International Application No. PCT/EP2020/060281 dated Jun. 12, 2020 (16 pages).
IPRP issued in International Application No. PCT/EP2020/060281 dated Jul. 27, 2021 (34 pages).
Ericsson, "TSN QoS and traffic scheduling in 5GS", 3GPP TSG-SA WG2 Meeting #130, S2-1900609, Kochi, India Jan. 21-25, 2019 (9 pages).
3GPP TR 23.734 Draft V16.0.0+ (Feb. 2019), 3rd Generation Partnership Project; Technical Specification Group Services and System Aspects; Study on enhancement of 5GS for Vertical and LAN Services (Release 16), Feb. 2019 (110 pages).
IEEE Std. 802.1CB-2017, IEEE Standard for Local and metropolitan area networks, Frame Replication and Elimination for Reliability, IEEE Computer Society (Sep. 2017) (102 pages).

* cited by examiner

AVOIDING JITTER IN A COMMUNICATION SYSTEM

CROSS REFERENCE TO RELATED APPLICATION(S)

This application is a 35 U.S.C. § 371 National Stage of International Patent Application No. PCT/EP2020/060281, filed Apr. 9, 2020, which claims priority to U.S. provisional patent application No. 62/853,827, filed on May 29, 2019. The above identified applications are incorporated by this reference.

TECHNICAL FIELD

This disclosure relates to avoiding jitter in a communication system.

BACKGROUND

Some communication devices (e.g., sensors, robots, controllers, etc.) used in some production processes (e.g., in automated factories) are highly sensitive to network jitter (or jitter for short). Jitter is generally known as the variation in the delay of received protocol data units PDUs (e.g., IP packets, Ethernet frames, TCP segments, etc.). As used herein the term "packet" is used broadly to mean a PDU. In some applications, packets are sent by a transmitting device in a continuous stream with the packets being spaced evenly apart (e.g. one packet is sent every 10 ms). Due to network congestion, improper queuing, or configuration errors, this steady stream of packets can become "lumpy" (i.e., the delay between each packet can vary instead of being a constant of 10 ms).

In a wireless communication system, causes of jitter include: a) radio coverage issues; b) radio capacity issues; and c) other connectivity network issues. Mobile communication devices associated with considerable amount of data can cause radio related jitter by blocking signals and/or overloading a radio link.

Today, wired industrial Ethernet solutions such as PROFINET® and EtherCAT® are mostly used in a factory floor to interconnect sensors, actuators, robots, and controllers in an automation system. Time-Sensitive Networking (TSN) is a set of standards under development by the Time-Sensitive Networking task group of the IEEE 802.1 working group. The TSN standards aim to provide technology that will be able to provide manufacturing industries with deterministic, guaranteed latencies, and extremely low packet loss services.

One of the IEEE TSN standards, 802.1Qbv, can provide on-time delivery of TSN Ethernet frames. It defines a means to transmit certain TSN Ethernet frames on a schedule. Because all network elements share the same time, end devices and bridges implementing Qbv can deliver critical communication very quickly and with no discernible jitter in delivery.

FIG. 1 illustrates how TSN can be integrated with a communication network 100 (e.g., a 3GPP network). In the example shown, the communication network 100 is a 3GPP 5G network comprising a 5G user plane function (UPF) 104 in communication with a 5G base station (gNB) 104 in wireless communication with a user equipment (UE) 102 (a UE is any communication device that is able to wirelessly communicate with gNB 104). As further shown in FIG. 1, network 100 may further include a first TSN translator (TT) 111 for interfacing with a TSN bridge 121 or end-host 131 and a second TT 112 for interfacing with a TSN bridge 122 or end-host 132. The basic principle is that the communication network 100 is seen as a virtual TSN bridge 106 (a.k.a., TSN switch).

In some TSN deployments it is critical that packets arrive on-time (e.g., it is critical that the packet neither arrive too early nor arrive too late). However, latency in a communication network, such as communication network 100, may have large variations from time to time due to several uncertainties in the communication network (e.g. radio channel conditions, network routing paths). For example, there may be a significant difference between the uplink maximal latency (e.g., 4.1 ms) and the downlink maximal latency (2.2 ms) due to the asymmetric characteristics from the radio system implementation. Additionally, the uplink and downlink latencies may have a large variation (e.g., from 0.33 ms to 4.1 ms for the uplink traffic and 0.33 ms to 2.2 ms for the downlink traffic).

SUMMARY

To compensate for the latency variations introduced by a communication network, a de jitter function can be deployed to hold-and-forward packets such that the packets are delivered with an agreed fixed latency of L ms. Generally, the de jitter function can be placed at the edge of the virtual 5G TSN switch (e.g. the de jitter function can be deployed as part of a UPF for uplink (UL) packets and/or it can be deployed as part of a UE for downlink (DL) packets). By using the de jitter function, the TSN can consider the communication network as generally having a consistent, deterministic latency of L ms with no jitter.

In the de-jitter solution described above, the de-jitter function employs a de-jitter buffer (a.k.a., "playout" buffer or "transmit" buffer) that is used to hold received packets for a certain amount of time (a.k.a., the packet hold time) so that the agreed fixed latency (a.k.a., "maximum packet-hold time" or "desired packet delay") is achieved and jitter is avoided (i.e., the spacing between packets is preserved such that the pace of outgoing packets can be made equal to the pace of incoming packets). Accordingly, for each received packet, the de jitter function may delay the forwarding of the packet (i.e., not forward the packet immediately upon receiving the packet) so that the packet will have a total delay equal to the desired packet delay (i.e., the agreed fixed latency). The desired packet delay is a function of maximum latency (e.g., it is usually equal to or greater than the maximum latency that may occur when a packet is forwarded through the wireless network). The 3GPP conference paper R2-1814992 states: "For the TSN requirements evaluation in RAN, we only need to consider maximum allowable latency value and can disregard jitter." This means that the maximum packet-hold time (or desired packet delay) should be set based on the worst-case scenario (i.e., the maximum latency).

In one possible implementation of the de jitter function, each packet received at the ingress point (e.g., TT 111 for UL packet or TT 112 for DL packets) is modified to include a timestamp indicating the absolute time at which the packet was received at the ingress point and then the modified packet is forwarded to the egress point (e.g., TT 112 for UL packets or TT 111 for DL packets). When the egress point receives the modified packet the egress point can use the timestamp in the packet to calculate the total delay experienced by the packet in travelling from the ingress point to the egress point. That is, the egress point can use its clock to determine the absolute time at which the packet was received at the egress point and then subtract from this the time specified by the timestamp. We shall denote this calculated delay as D. If the agreed fixed latency is L, then the egress point will hold the packet for an amount of time equal to L minus D and then forward to packet towards the end-host, thereby ensuring that the packet experiences the agreed fixed latency of L. In this way, all packets traversing the communication network will experience the same deterministic agreed latency.

A problem with the above described implementation is that such timestamping is a very challenging task, particular when the spacing between packets is small (e.g., each micro-second a new packet arrives at the ingress point).

Accordingly, this disclosure discloses methods for providing a deterministic delay that does not rely on use of such timestamps. For example, instead of the ingress point modifying a packet, which is received within a particular time slot, to include a timestamp indicating the absolute time, the ingress point modifies the received packet to include a slot identifier indicating the particular time slot in which the packet was received, and then the ingress point forwards the modified packet to the egress point. When the egress point receives the modified packet, the egress point removes the slot identifier from the packet and, based on the slot identifier that was included in the packet and the agreed latency (i.e., L), the egress point determines the slot in which to transmit the packet towards the end-host. For example, in one embodiment, if the agreed latency is L microseconds and the slot identifier in the packet identified that the packet was received in "input" slot 3, then the egress point will transmit the packet towards the end-host in "output" slot 3 where the time difference between the beginning of input slot 3 and the beginning of output slot 3 is L microseconds.

Thus, in one embodiment there is provided a method that includes an ingress point of a communication network receiving a packet, wherein the packet is received at a time that is within a particular time slot. The method further includes the ingress point creating a modified packet that includes the received packet and a slot identifier indicating the particular input time slot in which the packet was received. The method further includes the ingress point transmitting the modified packet towards an egress point. In one embodiment, the ingress point creates the modified packet by adding a tag to the packet, wherein the tag comprises the slot identifier. In one embodiment the received packet is an Ethernet frame and the tag is an Ethernet Redundancy tag (R-TAG) that is added to the Ethernet header of the Ethernet frame. In one embodiment the R-TAG consists of six octets and the slot identifier is contained within the last two octets of the R-TAG. In one embodiment, the method also includes the ingress point, during at least a period of time, incrementing a slot counter value every T units of time, wherein T represents an amount of time between slots. In some embodiments, the slot identifier is the value of the slot counter at the time the ingress point received the packet. In some embodiments, the ingress point initializes the slot counter value to an initial value at a predetermined ingress slot open time and thereafter increments the slot counter value every T units of time. In some embodiments, the packet is part of a particular packet stream and the method further comprises the ingress point initializing the slot counter value to an initial value in response to receiving the first packet of the particular packet stream.

In another embodiment there is provide a method that includes the egress point of the communication network receiving the packet that was transmitted by the ingress point. The method also includes the egress point determining the slot identifier included in the received packet (in some embodiments, the egress point also modifies the received packet by removing the slot identifier from the received packet, thereby re-creating the packet that was received at the ingress point). The method also includes the egress point determining, based on the slot identifier, a slot in which to transmit the received packet (or a modified version thereof) towards an end-host. The method further includes the egress point transmitting the packet in the determined slot. In one embodiment, the received packet comprises a tag that contains the slot identifier and the step of removing the slot identifier from the received packet comprises removing the tag from the received packet. In one embodiment the received packet is an Ethernet frame and the tag is an R-TAG. In one embodiment the R-TAG consists of six octets and the slot identifier is contained within the last two octets of the R-TAG. In some embodiments, the egress point, during at least a period of time, increments a slot counter value every T units of time, wherein T represents an amount of time between slots. In some embodiments, the egress point initializes the slot counter value to an initial value at a predetermined egress slot open time and thereafter increments the slot counter value every T units of time.

In another aspect there is provided a computer program comprising instructions which when executed by processing circuitry causes the processing circuitry to perform any of the methods disclosed herein. In another aspect there is provided a carrier containing the computer program.

In another aspect there is provided an ingress point of a communication network. The ingress point being configured to create a modified packet based on a received packet, wherein the modified packet includes the received packet and a slot identifier indicating a particular time slot in which the packet was received. The ingress point is also configured to transmit the modified packet towards an egress point of the communication network.

In another aspect there is provided an egress point in a communication network. The egress point being adapted to receive a packet that was transmitted by an ingress point of the communication network, wherein the received packet comprises a packet that was received at the ingress point and a slot identifier. The egress point is also adapted to determine the slot identifier included in the received packet. The egress point is also adapted to store in a transmit buffer the received packet or a modified version of the received packet. The egress point is also adapted to determine, based on the slot identifier, a time at which to transmit the received or modified packet towards an end-host. The egress point is also adapted to transmit the received or modified packet at the determined time.

In another aspect there is provided an apparatus comprising processing circuitry and a memory, where the memory contains instructions executable by the processing circuitry, whereby the apparatus is operative to perform any one of the methods disclosed herein.

BRIEF DESCRIPTION OF THE DRAWINGS

The accompanying drawings, which are incorporated herein and form part of the specification, illustrate various embodiments.

DETAILED DESCRIPTION

Figure 1:
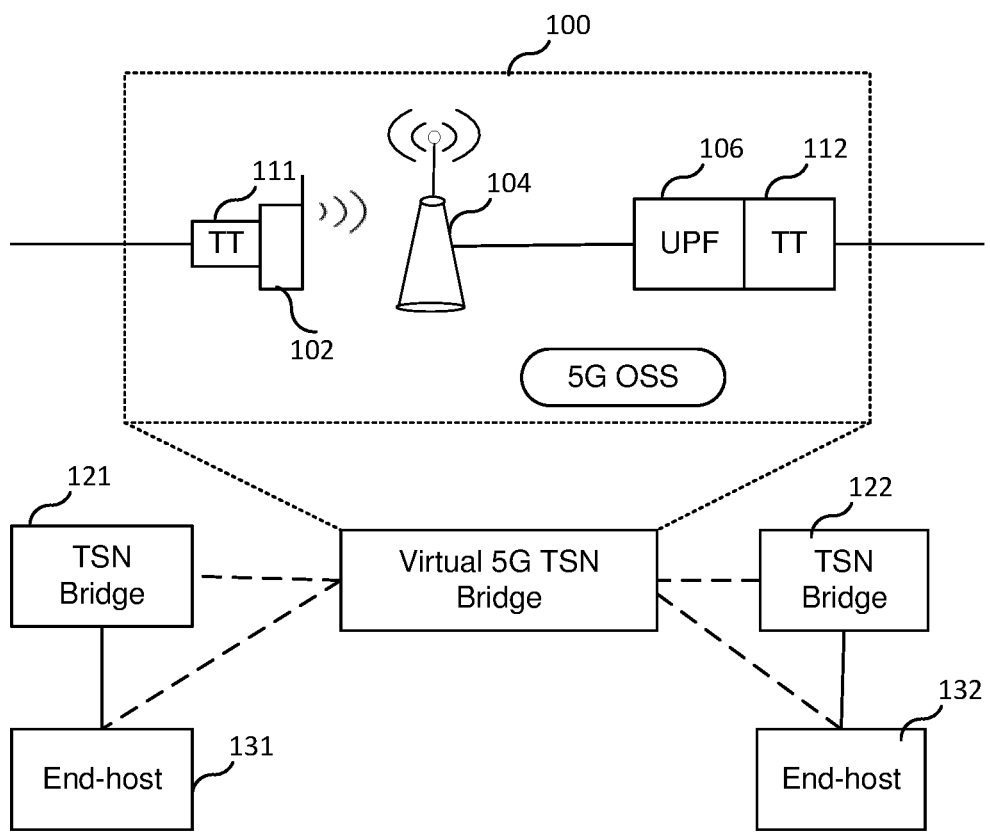
FIG. 1 illustrates how TSN can be integrated with a communication network.
Figure 2:
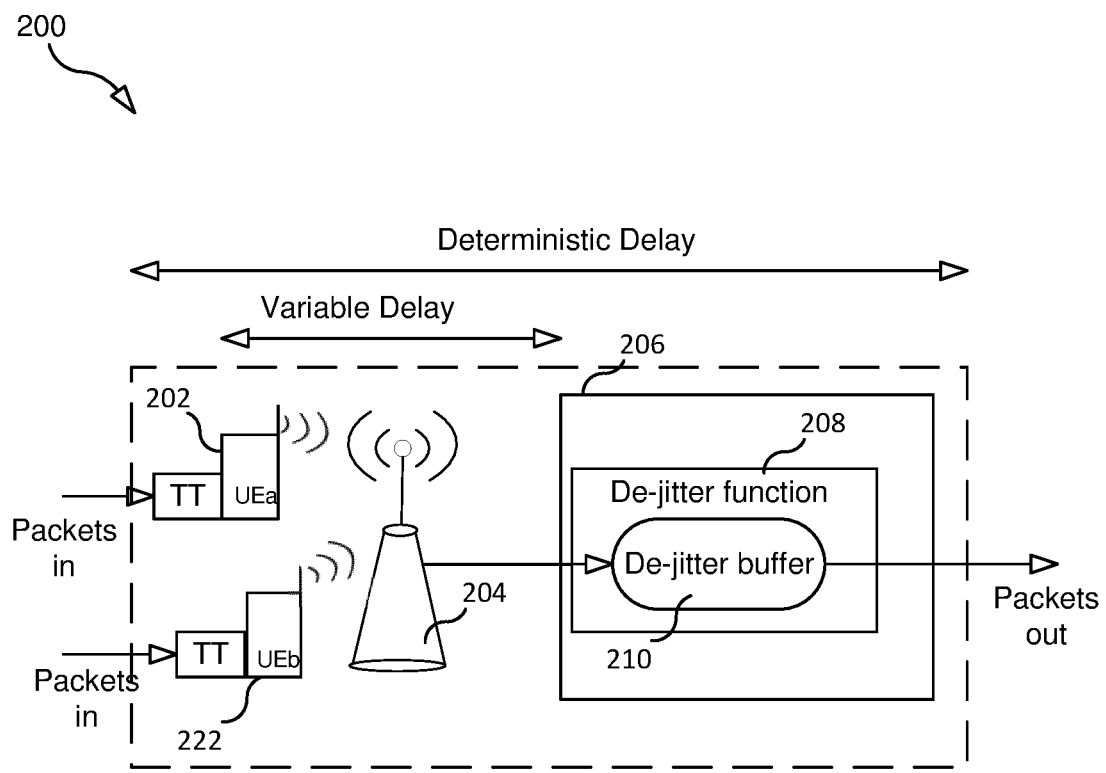
FIG. 2 illustrates a system according to an embodiment.

FIG. 2 illustrates a network 200 according to an embodiment in which a de-jitter function is a component of a network node (e.g., UPF or TT) 206. However, as noted above, the de jitter function may be located in other devices (e.g., a user equipment 202 and/or 222) as well. Network 200 includes user equipments (UEs) 202 and 222, which are devices capable of wireless communication with an access point (e.g. access point 204) (e.g., a 3GPP base station, such as, for example, a 3GPP 5G base station (gNB)). Each of UEs 202 and 222 may be a controller (or a component of a controller) that is used to control equipment in a factory. As shown in FIG. 2, each UE 202, 222 comprises a TT module. In the example shown in FIG. 2, UEs 202, 222 are ingress points and network node 206 is an egress point. However, for a packet traveling in the other direction, the network node 206 would be the ingress point and at least one of the UEs would be the egress point.

Access point 204 is communicatively connected to network node 206 (e.g., a gateway, a switch). Network node 206 includes a de-jitter function 208 that employs a de-jitter buffer 210 to hold packets received from access point 204 for the purpose of removing jitter from a stream of packets. Each of UEs 202 and 222 obtain packets (e.g., generate packets or receive packets from another device, such as, for example, a TSN end-host or TSN bridge) and wirelessly forward the obtained packets. In the example, shown both UE 202 and UE 222 forward their obtained packets to network node 206 via access point 204. However, in other embodiments UEs 202 and 222 may communicate with network node 206 via different access points. Still in other embodiments, UE 202 may communicate with network node 206 via access point 204 while UE 222 communicates with a different UPF via a different access point.

Figure 3:
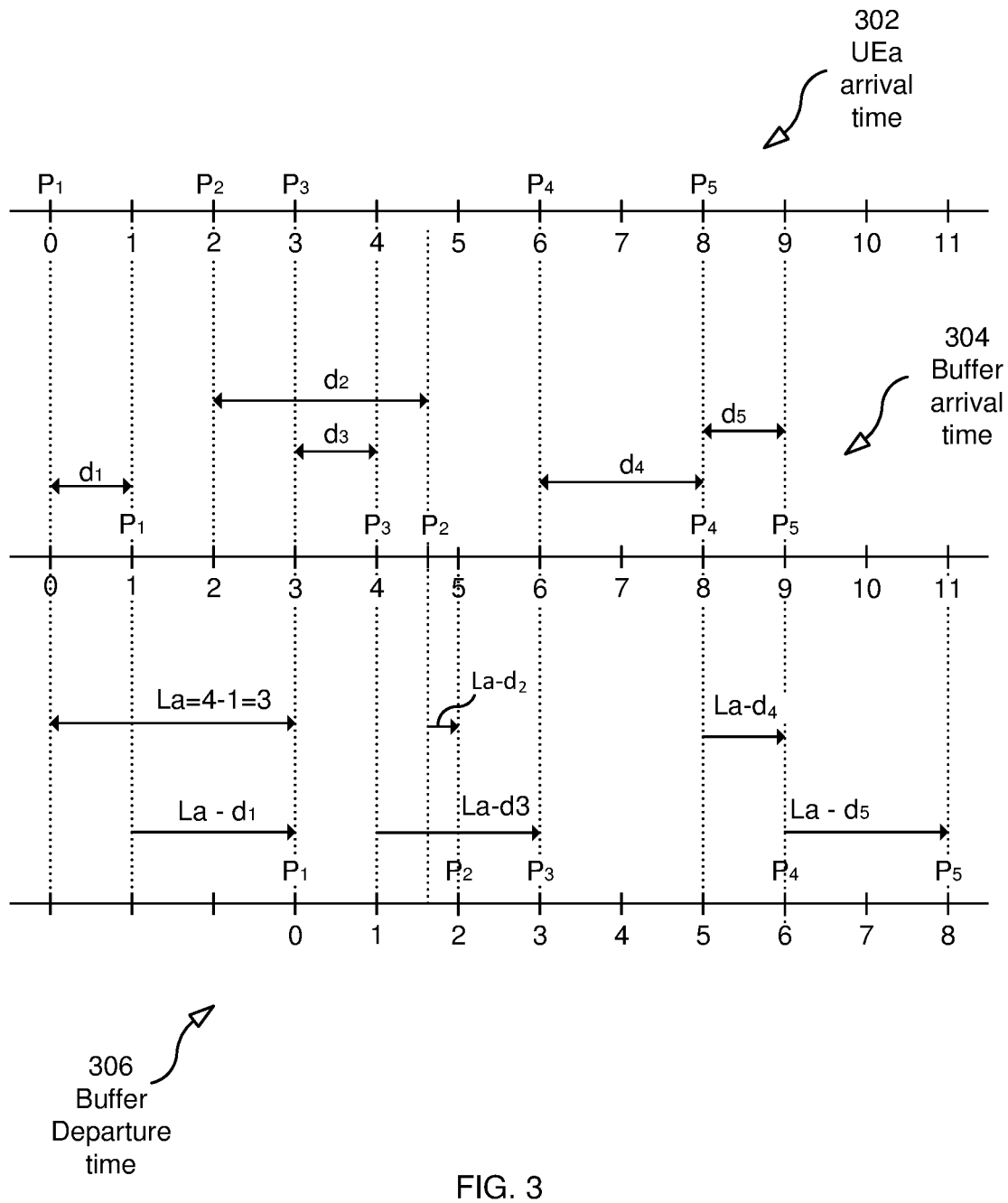
FIG. 3 is an example a packet timing diagram.

FIG. 3 illustrates an example packet timing diagram, which illustrates a fluctuation in UL packet latencies (e.g., packets transmitted by UE 202). The top timeline 302 illustrates the time slot in which each packet in a sequence of packets (i.e., packets P1 to P5) are obtained (e.g., received or generated) by UE 202 (these are referred to as the "Ingress Arrival Times"). In some embodiments, UE 202 is a component of a device (e.g., a robot control device) and another component of the device (e.g., a controller) generates the sequence of packets and provides the packets to UE 202 (i.e., UE 202 receives the packets generated by the other component of the device). In such an embodiment, the Ingress Arrival Time may be the time at which these packets generated by the other component are received at UE 202.

The middle timeline 304 illustrates the times at which packets P1 to P5 are received at network node 206 (these are referred to as the "Buffer Arrival Times"). And the bottom time line 306 illustrates the times at which packets P1 to P5 are forwarded by the network node 206 to the next device (e.g., TSN bridge, controller, etc.) (these are referred to as the "Buffer Departure Times").

As FIG. 3 demonstrates, there is a variable latency between UE 202 and network node 206 because some packets transmitted by UE 202 to network node 206 are delayed more than other packets. For instance, packet P2 experienced a delay of d2, whereas packet P3 experienced a delay of d3 (d3<d2). Accordingly, the sequence of packets experiences jitter.

To remove the jitter and thereby provide a deterministic latency, network node 206 utilizes de-jitter function 208, which i) employs de-jitter buffer 210 to hold each packet for a certain amount of time (referred to as the "packet hold time") and ii) then forwards the packet when the packet hold time has elapsed.

As FIG. 3 indicates, in one embodiment, the amount of time that each packet originating from UE 202 (which we will now refer to a UEa) is held in the de-jitter buffer 201 is a function of La, where La is the maximum packet-hold time for UEa (i.e., the agreed upon latency for UEa). The maximum packet-hold time is typically based on a worst-case scenario—the maximum latency. Typically, La is large enough so that 99.99999% packets are ensured to go through without dropping (packet loss). At the same time, La should be as small as possible.

Referring back to FIG. 3, in the embodiment shown, de jitter function 208 holds packet Pi (i=1, 2, 3, 4, or 5 in this example) for an amount of time that is equal to: La–di, where di is the amount of delay experienced by packet Pi and La is equal to 3 units of time in this example. Thus, for example, the packet-hold time for packet P3 is La–d3 (i.e., 3–1=2, in this example), while the packet-hold time for packet P2 is La–d2 (i.e. 3–2.7=0.3).

In an alternative embodiment, de jitter function 208 holds an initial packet (i.e., P1 in this example) originating from UEa for an amount of time equal to La, and, for each subsequent packet Pi (i=2, 3, 4, . . . ) de jitter function 208 hold the packet Pi for amount of time equal to: La–di so that all subsequent packets Pi will experience the same delay (i.e., La). In this way, in this alternative embodiment, jitter is removed and the delay in traversing network 200 is deterministic for packets Pi (i=2, 3, 4, . . . ).

While FIG. 3 illustrates a scenario for UEa, the same applies to UEb (i.e., UE 222) because the packets originating from UEb also experience a variable latency as they traverse the network 200 to the network node 206. Accordingly, in one embodiment, de-jitter function 208 holds each packet originating from UEb for an amount of time equal to: Lb–di, where Lb may or may not be equal La and di is the actual delay experienced by packet di. That is, the maximum latency for UEb may be different than the maximum latency for UEa due to UEb experiencing different radio conditions than UEa.

In the de-jitter solutions described above, the de jitter function 208 holds received UL packets for a certain amount of time so that the agreed fixed latency (e.g., La, Lb) is achieved and jitter is avoided (i.e., the pace of outgoing packets can be made equal to the pace of incoming packets). The same principle applies to DL packets, in which case a de jitter function just like de-jitter function 208 may be a component of UEa and UEb. Accordingly, for each packet (UL or DL) received at the de-jitter function, the de-jitter function may delay the forwarding of the packet (i.e., not forward the packet immediately upon receiving the packet)

so that the packet will have a total delay equal to the desired packet delay (i.e., the agreed fixed latency). The desired packet delay is a function of maximum latency (e.g., it is usually equal to or greater than the maximum latency that may occur when a packet is forwarded through the wireless network). That is, to ensure that packets are not dropped, La and Lb should be at least as large as the maximal latency.

One approach is to assume a single worst case scenario (e.g., a single maximal latency) that applies for all UEs, and, therefore, set La=X and Lb=X, where X is a function of this assumed single maximal latency. However, in situations where a sequence of packets from UEa has a lower maximal latency than a sequence of packets from UEb, assuming a single maximal latency is not an optimal approach because the packets from UEa will be buffered longer than they need to be.

Figure 4:
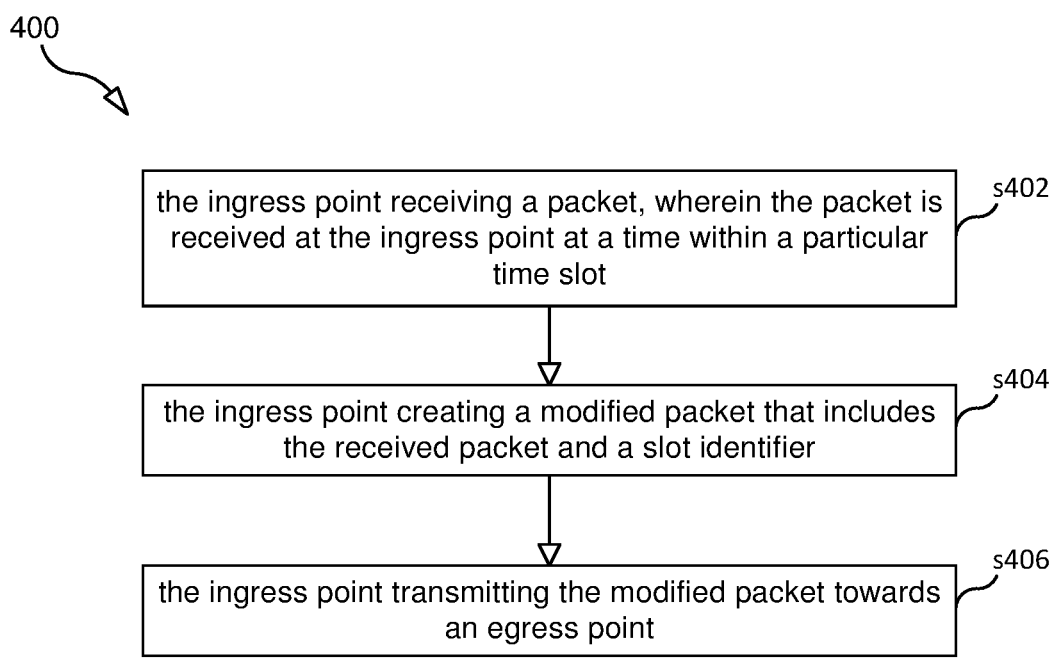
FIG. 4 is a flow chart illustrating a process according to an embodiment.
Figure 5:
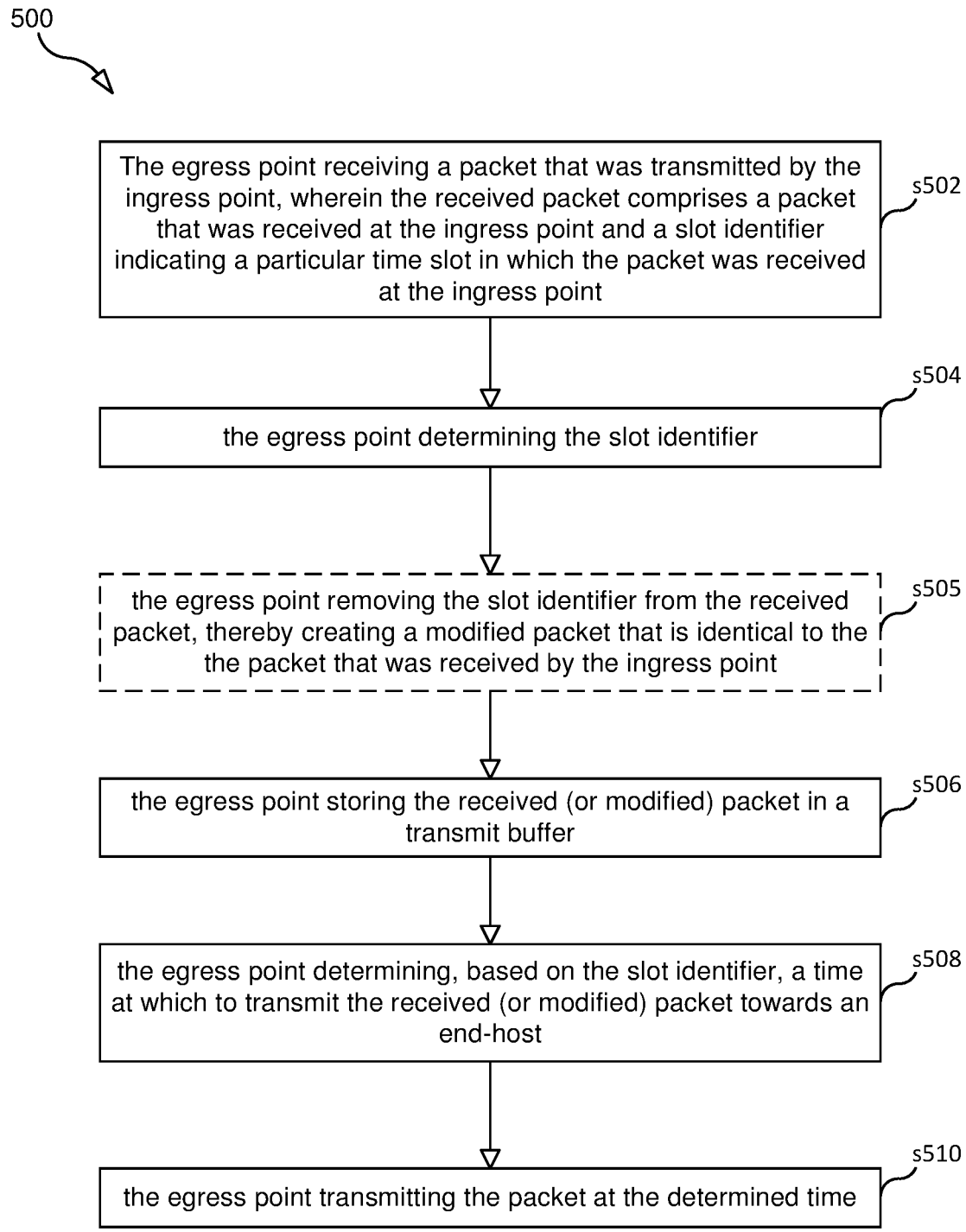
FIG. 5 is a flow chart illustrating a process according to an embodiment.

Referring now to FIGS. 4 and 5, these figures illustrate a process 400 performed by an ingress point (e.g., network node 206 for DL packets and UE 202 for UL packets) and a process 500 performed by an egress point (e.g., network node 206 for UL packets and UE 202 for DL packets), respectively. These processes 400 and 500 enable the de jitter function to remove jitter.

Process 400 may being in step s402. Step s402 comprises the ingress point of the communication network receiving a packet that is part of a packet stream (a.k.a., packet flow), wherein the packet is received at the ingress point at a time within a particular time slot. In one embodiment, each packet stream may have a different "time slot spacing" (i.e., the interval of time between the beginning of slot i and the beginning of slot i+1). The time slot spacing is also referred to as the "slot cycle." It is assumed here that during any given slot, the ingress point receives at most a single packet.

Step s404 comprises the ingress point creating a modified packet that includes the received packet and a slot identifier indicating the particular time slot in which the packet was received. In one embodiment, the ingress point creates the modified packet by adding the slot identifier to the received packet (e.g., adding the slot identifier to a header or payload portion of the received packet), thereby creating the modified packet. In one embodiment, the ingress point adds the slot identifier to the received packet by adding a tag to the packet, wherein the tag comprises the slot identifier. In some embodiments, the received packet is an Ethernet frame and the tag is an Ethernet Redundancy tag (R-TAG) that is added to the Ethernet header of the Ethernet frame. The R-TAG consists of six octets and, in one embodiment, the slot identifier is contained within the last two octets of the R-TAG.

Step s406 comprises the ingress point transmitting the modified packet towards an egress point.

In one embodiment, the slot identifier is determined based on a slot counter value that is periodically incremented. For example, the ingress point increments the slot counter value every T units of time, where T is the amount of time between slots (i.e., T is the "time slot spacing" or "slot cycle"). Because each packet stream may have a different value of T, the ingress point may maintain a different slot counter value for each packet stream that it receives.

For example, if, for a particular packet stream, the slot cycle is 3 microseconds, then the ingress point can set the slot counter value to an initial value (e.g., 0 or some other initial value) and then increment the slot counter value by 1 every 3 microseconds. In one embodiment, at a predetermined slot start time (also referred to as the "slot open time") the ingress point sets the slot counter value to the initial value and then begins the process of incrementing the counter based on the slot cycle. In this way, when the ingress point receives each packet in the stream, the slot identifier for the packet can simply be equal to the slot counter value at the time the packet was received. In this embodiment, if the initial value is 0 then the slot counter value for packet Pi (i=1, 2, 3, 4, . . . ) will equal the number of slots between the arrival of packet Pi and the predetermined ingress slot start time. In another embodiment, when the first packet (P1) in the stream arrives the ingress point sets the slot counter value to the initial value and then begins the process of incrementing the counter based on the slot cycle. In this way, when the ingress point receives each packet in the stream, the slot identifier for the packet can simply be equal to the slot counter value. In this second embodiment, if the initial value is 0 then the slot counter value for packet Pi (i=2, 3, 4, . . . ) will equal the number of slots between packet Pi and packet P1.

Using FIG. 3 as an example, the slot identifier for packets P1-P5 may be 0, 2, 3, 6, and 8, respectively. In this way the slot identifier for packet Pi will indicate the particular time slot in which the packet was received at the ingress point by specifying the number of slots between packet Pi and P1. This proposed solution is resistant to possible error situations. For example, if packet loss occurs inside the communication network 200 it will not impact the delivery of the other packets belonging to the same stream. A packet loss results in no packet transmission at the egress in the given time slot because of the pairing of slot identifier and egress time slot.

In embodiments where L=n*T (n is an integer greater than 0 and T=slot-cycle), the slot identifier for a packet can be set equal to the slot counter value at the time the packet was received plus the desired packet delay (L) . For example, if the counter value is V when packet Pi arrives at the ingress point, the ingress point can set the slot identifier for packet Pi to V+L. Thus, if we assume L=3 slots, then in this embodiment, the slot identifier for packets P1-P5 may be 3, 5, 6, 9, and 11, respectively. In such an embodiment the slot identifier for packet Pi will still indicate the particular time slot in which the packet was received at the ingress point because the slot in which the packet was received is simply the slot identifier minus D. In such an embodiment, if we assume that the egress point's slot counter is synchronized with the ingress point's slot counter (i.e., both the ingress and egress activate their respective slot counters at the same time), then the egress point will transmit packets P1-P5 in output slots 3, 5, 6, 9, and 11, respectively.

In another embodiment, after the ingress points determines the value of the slot counter when a packet arrives, the ingress point resets the slot counter value to the initial value (e.g., 0) and then resumes incrementing the slot counter value by 1 every T units of time. Using FIG. 3 as an example, the slot identifier for packets P2-P5 in this alternative embodiment would be 2, 1, and 3, respectively. In this way the slot identifier for packet Pi will indicate the particular time slot in which the packet was received at the ingress point by specifying the number of slots between packet Pi and Pi-1. In such an embodiment, if we assume that, after the egress point transmits each packet, the egress point's slot counter is reset and then resumes incrementing the slot counter value by 1 every T units of time, then the egress point will transmit packets P2-P5 in output slots 2, 1, and 3, respectively (this assume that the egress will hold the first packet for at least L−d1).

The embodiments work for constant bit rate (CBR) streams as well as for non-CBR streams. In industrial networks such non-CBR flows are either flows with same packet periodicity but different frame/packet sizes or flows with "holes" in the flow (i.e., no frames/packet sent for a while). The proposed solution works in both cases as the slot identifier slot is specific.

Process 500 (see FIG. 5) may begin with step s502. Step s502 comprises an egress point of communication network 200 (e.g., UE 202 for DL packets and network node 206 for UL packets) receiving a packet that was transmitted by an ingress point of the communication network (e.g., UE 202 for UL packets and network node 206 for DL packets), wherein the received packet comprises a packet that was received at the ingress point and a slot identifier. The slot identifier indicates a particular time slot in which the packet was received at the ingress point.

Step s504 comprises the egress point determining the slot identifier included in the received packet. In an optional step s505, the egress point modifies the received packet by removing the slot identifier from the received packet, thereby re-creating the packet that was received at the ingress point. In some embodiments, the received packet comprises a tag that contains the slot identifier, and the step of removing the slot identifier from the received packet comprises removing the tag from the received packet. In some embodiments, the received packet is an Ethernet frame and the tag is an R-TAG, which consists of six octets, and the slot identifier is contained within the last two octets of the R-TAG.

Step s506 comprises the egress point storing in a transmit buffer 210 the received packet (or the modified version thereof in the embodiments in which the slot identifier is removed from the received packet).

Step s508 comprises the egress point determining, based on the slot identifier, a time at which to transmit the received (or modified) packet towards an end-host.

Step s510 comprises the egress point transmitting the received (or modified) packet at the determined time.

In one embodiment, the egress point determines the time at which to transmit the packet based on the slot identifier and a slot counter value that is periodically incremented by the egress point every T units of time (where T is the slot cycle for the packet stream to which the packet belongs). In one embodiment, the determined time at which to transmit the packet is the time at which the slot counter value maintained by the egress point equals the slot identifier.

For example, assuming that the ingress point sets its slot counter value to some initial value at a specified ingress slot open time and thereafter increments its slot counter value by 1 every T units of time (T=the slot cycle), and assuming that the egress point sets its slot counter value to the same initial value at a specified egress slot open time and thereafter increments its slot counter value by 1 every T units of time, then when the egress point's slot counter value equals the slot identifier, the egress point knows that it is now time to transmit the packet. In this scenario, difference between the egress slot open time and the ingress slot open time should be equal to a predetermined L value for the stream to which the packet belongs. That is, the output slots (see bottom line of FIG. 3) are shifted by L with respect to the input slots (see top line of FIG. 3).

As another example, assuming that the ingress point sets its slot counter value to some initial value when the first packet in the stream is received and thereafter increments its slot counter value by 1 every T units of time, and assuming that the egress points buffers the first packet in the stream for an amount of time (Bt), then when the egress point transmits towards the end-host the first packet in the packet stream, the egress point will set its slot counter value to the same initial value (e.g., 0) to which the slot counter value maintained by the ingress point was set when the ingress point received the first packet. After setting its slot counter value to this initial value, the egress point then increments its slot counter value by 1 every T units of time. For each subsequent packet, when the egress point's slot counter value equals the slot identifier contained in the packet, the egress point knows that it is now time to transmit the packet. In this example, the output slots are shifted by amount equal to Bt+d1 (d1=delay experience by the first packet) with respect to the input slots. If the egress point knows d1, then the egress point can set Bt equal to L-d1 so that the shift between the input slots and the outputs is L. One way for Bt to know d1 is for the ingress point to include in the first packet a timestamp specifying the absolute time at which the first packet was received at the ingress point.

As another example, assuming the embodiment in which the ingress point re-sets its slot counter value to the initial value after receiving each packet, then when the egress point transmits towards the end-host any packet in the packet stream, the egress point will re-set its slot counter value to the same initial value (e.g., 0). After re-setting the slot counter value to this initial value, the egress point then increments its slot counter value by 1 every T units of time. When the egress point's slot counter value equals the slot identifier, the egress point knows that it now time to transmit the packet. In this way, the packet will be transmitted S slots after the last packet in the stream was transmitted, where S is the value of the slot identifier for the packet. That is, in this example S is the slot spacing between packet Pi and Pi−1.

In both of the examples above, packet P1 is stored in the de jitter buffer for L amount of time and each subsequent packet Pi (i=2,3,4 . . . ) is stored in the de jitter buffer for L−di amount of time, where L is predetermined latency for the stream and di is the amount of time it took for the packet to go from the ingress point to the egress point. Accordingly, all of the packets Pi (i=1,2,3, . . . ) are delayed by the same amount (i.e., L).

Figure 9:
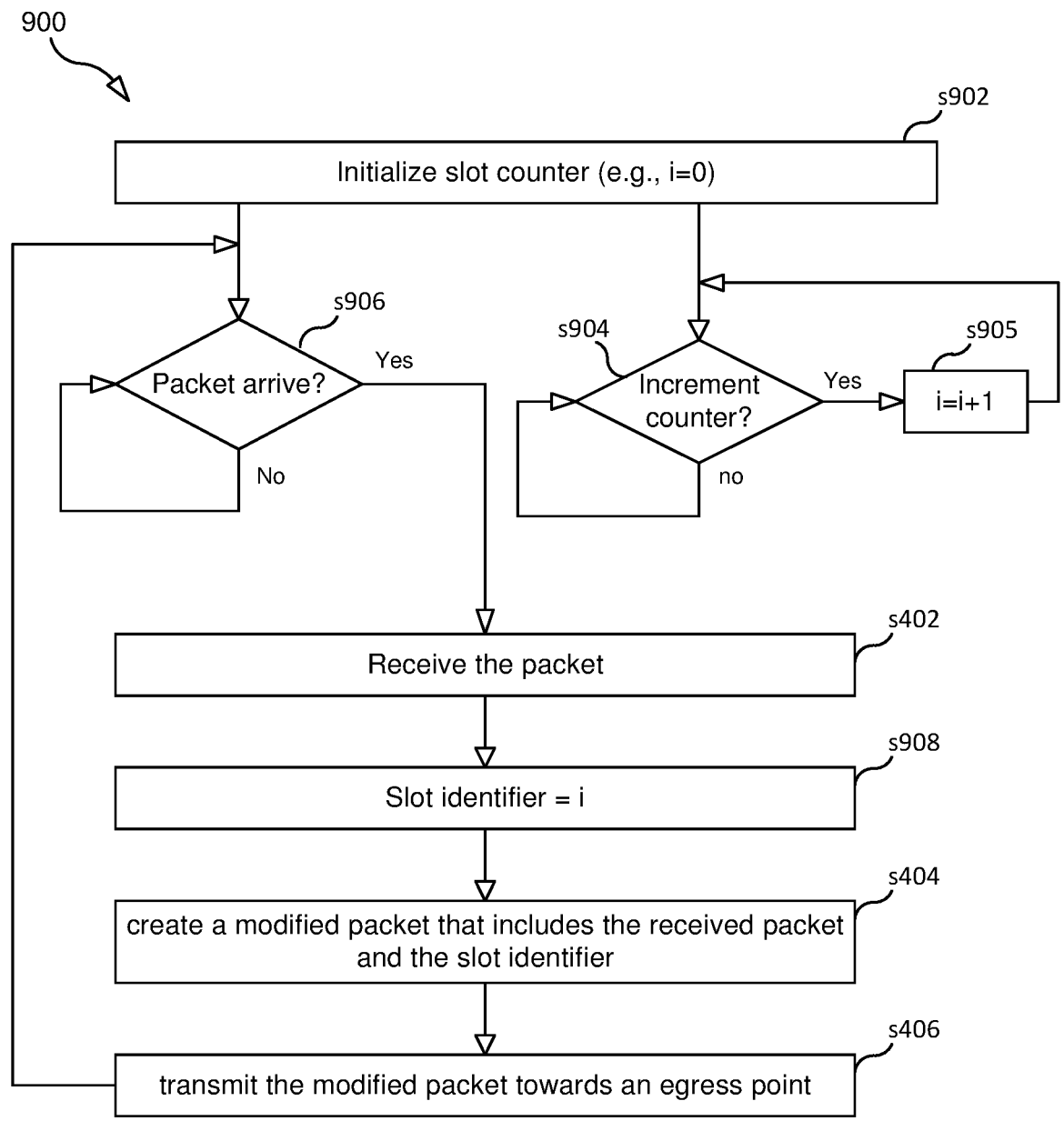
FIG. 9 is a flow chart illustrating a process according to an embodiment.

FIG. 9 is a flow chart illustrating a process (900) performed by the ingress point for a particular packet stream according to an above described embodiment. Process 900 may begin in steps s902.

Step s902 comprises the ingress point initializing a slot counter value (e.g., the ingress point sets a variable i=0, where i represents the slot counter value) for the particular stream. In one embodiment, the ingress point performs step s902 in response to receiving the first packet in the packet stream. In another embodiment, the ingress point performs step s902 at a predefined point in time (e.g., a point in time specified by configuration data for the stream).

After step s902, steps s904 and s906 may be performed in parallel.

Step s904 comprises the ingress point determining whether it is time to increment the slot counter value. As described above, each stream has a time slot spacing (T) and the slot counter value is incremented in accordance with the time slot spacing. For example, if the time slot spacing for this particular stream is 5 microseconds then the slot counter value may be incremented by one every 5 microseconds. If it is time to increment the slot counter value, then the ingress point increments the slot counter value (see step s905).

Step s906 comprises the ingress point detecting whether a packet has arrived. If a packet has arrived, the packet is received (e.g., stored in a receive buffer) (step s402).

Step s908, the ingress point sets the slot identifier for the received packet to the slot counter value (e.g., slot ID =i). After step s908 is performed, the ingress point performs steps s404 and s406, which are described above. In some embodiments, in step s908, rather than set slot ID =i, the ingress point sets slot ID=i+L, assuming L is equal to n*T, where n is an integer greater than 0.

Figure 6:
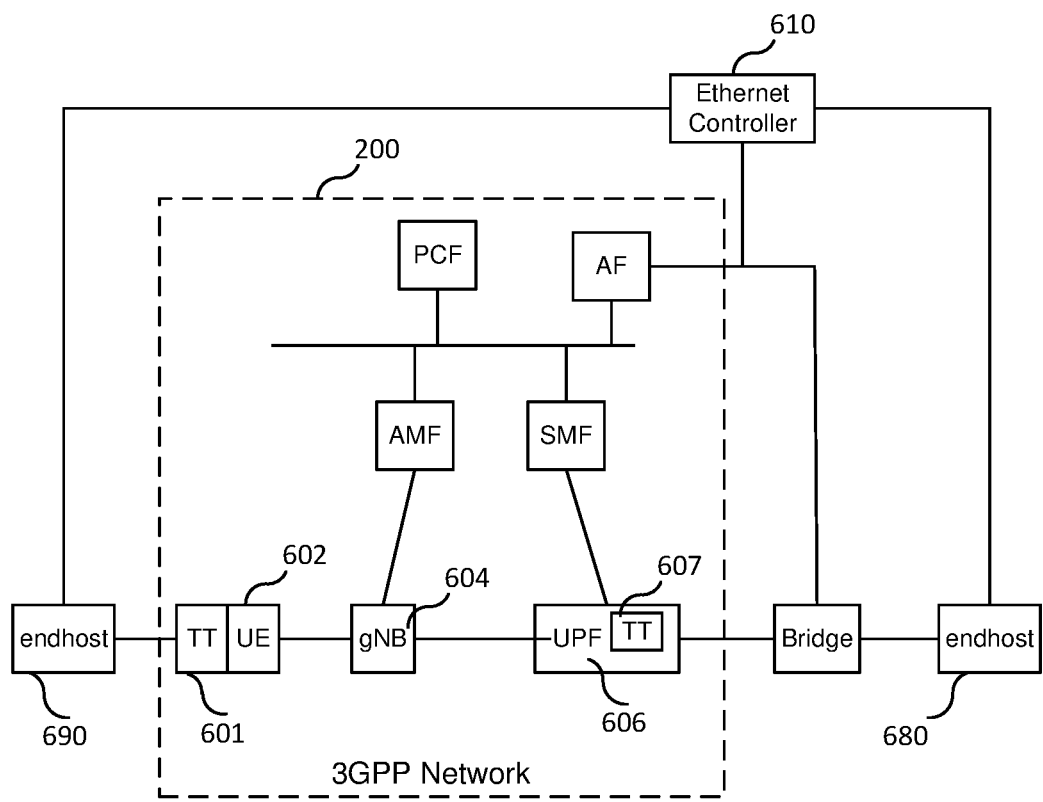
FIG. 6 illustrates a network according to an embodiment.

FIG. 6 shows one possible example of network 200. In the example shown, network 200 is a 3GPP 5G network. FIG. 6 shows UE 202 connected to a 3GPP gNB 604, which is connected to a 5G User Plane Function (UPF) 606, which contains TT 607, and the 3GPP CN control plane entities: AMF, SMF, PCF and AF. The Ethernet network is being controlled by an Ethernet Controller 610, which may be a combination of a Centralized Network Configuration (CNC) and Centralized User Configuration (CUC). A CNC is a component that configures network resources on behalf of TSN applications ("users"). A CUC is a component that discovers end stations, retrieves end station capabilities and user requirements, and configures TSN features in end stations. The protocols that the CUC uses for communication with end stations are specific to the user application, not specified in this standard. A CUC exchanges information with a CNC in order to configure TSN features on behalf of its end stations. The 3GPP network may act as a bridge within the Ethernet network, and present an interface to the Ethernet Controller 610. The AF may take the role of interfacing with the Ethernet Controller from the 3GPP network side. In the user plane, the TT (TSN Translator) entity 607 in the UPF 606 and the TT 601 connected to (or in) the UE 202 may act to control jitter using the method described above. That is, for example, TT 607 may function as the ingress point for DL packets (e.g., packets address to end-host 690) and may function as the egress point for UL packets (e.g., packet addressed to end-host 680).

One of the control plane entities (e.g., AF) may configure the ingress and egress points to implement the above described methods, respectively. For example, the AF can signal to the TT 607 via the SMF and possibly also via the PCF. The AF can signal to the TT 601 via the SMF, AMF, gNB and UE. In this way, the AF can instruct both the TT 607 UPF and the TT 601 to start performing the method described herein. For downlink traffic, the TT 607 acts as the ingress point and the TT 601 acts as the egress point. For uplink traffic, the TT 601 side acts as the ingress point and the TT 607 acts as the egress point.

The AF may provide to TT 601 and 607 the information needed to perform the above described methods (e.g., timing information, such as, for a given stream, the time slot spacing), and the AF may obtain this information from the Ethernet controller. The Ethernet controller, after collecting information from the entire Ethernet network and knowing the stream requirements, instructs the AF about the timing requirements of the traffic streams going via the 3GPP domain (e.g., the time slot spacing). Based on the information received from the Ethernet controller, the AF configures the TT 601 and TT 607.

Figure 7:
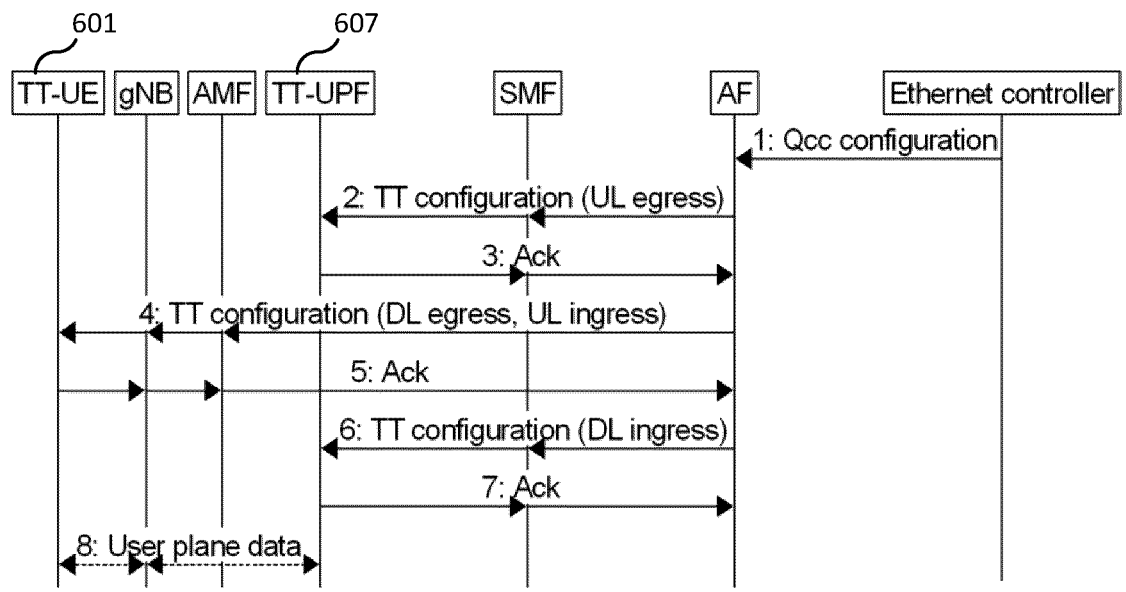
FIG. 7 is a message flow diagram illustrating a message flow according to an embodiment.

An example message flow diagram is shown in FIG. 7. Note that there may be many variants of this message flow. The names of the messages are exemplary, and the messages may either use already existing standardized messages, or use newly defined messages.

As shown in FIG. 7, the Ethernet controller sends the timing requirements of the Ethernet streams, e.g. using the IEEE 802.1Qcc standard. That is, for example, Ethernet controller sends to the AF a Qcc configuration message (message 1). Based on this information, the AF decides to apply the solution of this invention for a certain set of streams. The Ethernet controller designs and knows the timing of packets belonging to a TSN Stream end-to-end in the TSN network (i.e., arrival time at each hop, leave time at each hop). The network 200 shown in FIG. 6 is a "hop" inside the TSN network. The Ethernet controller informs the network 200 (e.g., AF) with timing and stream related information. The AF uses the information to configure its internal functions to ensure requirements of the Stream.

The timing information that the AF receives from the Ethernet Controller includes, for example: packet-arrival-time and inter-packet-time. Timing information is used to design the parameters of the stream specific slot-system inside the network 200 at both ingress and egress points. (Note: other information may be included, like packet-size (useful for bandwidth allocation), parameters to identify the stream (e.g., MAC addresses, VLAN-ID) etc. This other information can be used e.g., by gNB to optimize grant allocation on the air interface for the stream). 802.1Qcc is mentioned here, because it defines such parameters. Embodiments herein use the standard parameters.

The AF uses the timing information received from Ethernet Controller to determine the parameters of the slot-system at ingress and egress points. In one embodiment, the AF defines the following parameters for both ingress and egress point: (1) ingress slot-open-time, (2) egress slot-open-time, (3) slot-open-duration, (4) slot cycle and (5) slot-number. As explained above, the different between the ingress slot open time and the egress slot open time should be greater than worst case delay between the output of the ingress point (e.g., TT 607) and the input of the egress point (e.g. TT 601). As explained above, in some embodiments, at the ingress slot open time, the ingress point activates its counter (i.e., the ingress point sets its slot counter to an initial value (e.g., a value equal to the slot-number parameter) and then every T units of time increments the counter, where T=value of the slot-cycle parameter); and, at the egress slot open time, the egress point activates its slot counter (i.e., the egress point sets its slot counter to an initial value (e.g., a value equal to the slot-number parameter) and then every T units of time increments the counter). The slot-open-duration value informs the egress point and ingress point as to the time at which it may deactivate its slot counter.

After the AF defines the parameters, the AF transmits a number of TT configuration messages (e.g., TT configuration message 2, TT configuration message 4, and TT configuration message 6) as shown in FIG. 7 and described below TT configuration message 2 is transmitted via the SMF and UPF to TT 607. TT configuration message 2 includes the parameters for the uplink traffic egress side. The message is acknowledged (message 3).

TT configuration message 4 is transmitted to TT 601 via AMF, gNB, and UE. TT configuration message 4 includes the parameters for the downlink traffic egress side, and the uplink traffic ingress side. The signaling is acknowledged (message 5). TT configuration message 4 sent to TT 601 includes: (2) egress slot-open-time, (3) slot-open-duration, (4) slot-cycle and (5) slot-number. The message may include other information as well (e.g., for stream identification; buffer size to allocate for the TSN stream; etc.). The AF may communicate with AMF and gNB to optimize RAN characteristics (e.g., grant allocation on air interface, etc.).

TT configuration message 6 is transmitted to TT 607 via the SMF and the UPF. TT configuration message 6 includes the configuration for the downlink traffic ingress side. The signaling is acknowledged (message 7). For instance, TT configuration message includes: (1) ingress slot-open-time, (3) slot-open-duration, (4) slot-cycle and (5) slot-number.

Other information may be included in the message as well. TT 607 confirms the configuration by transmitting an acknowledgment (message 7). At this point network 200 is now ready to receive and forward packets of the stream so that each packet of the stream will experience the same deterministic delay.

Figure 8:
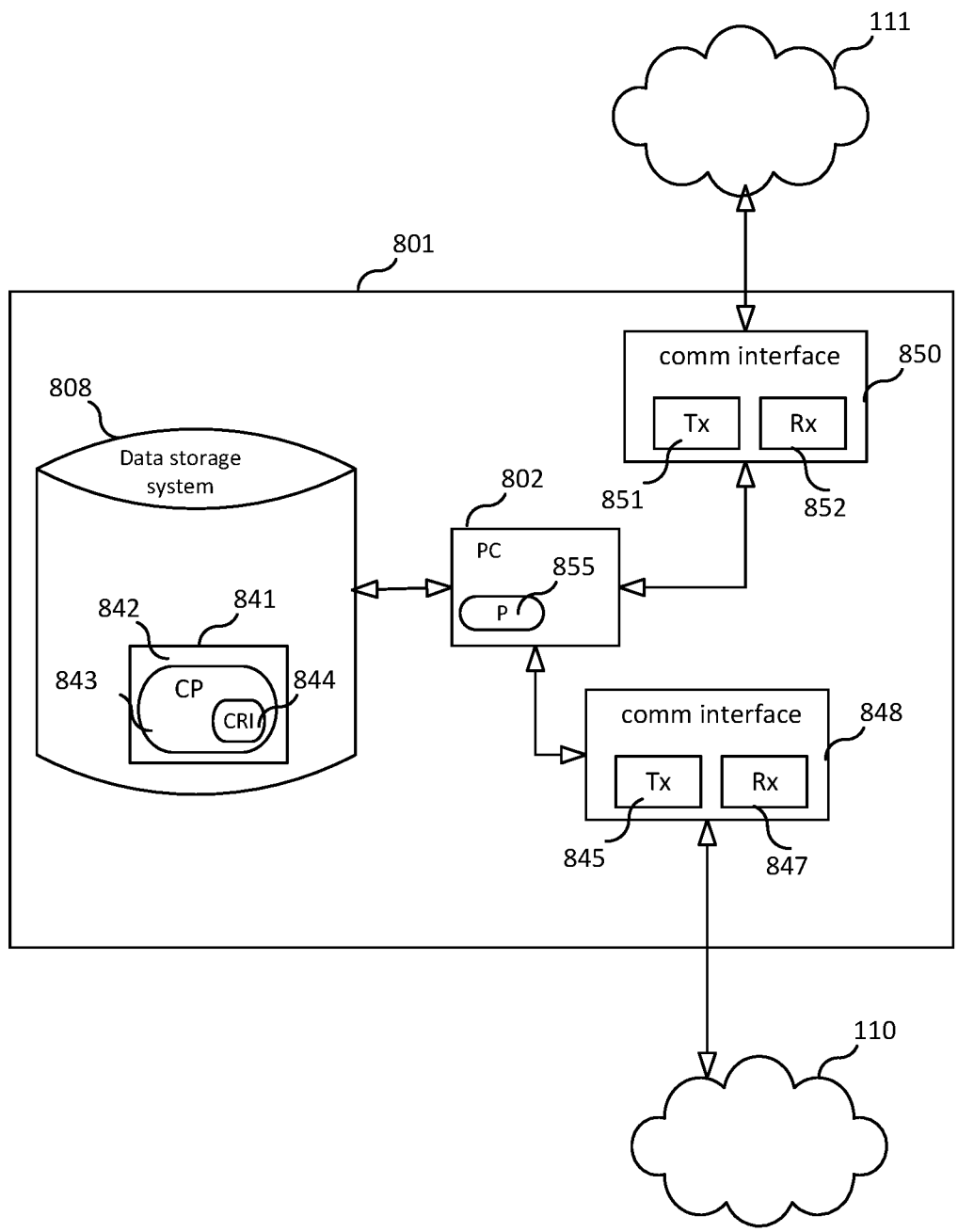
FIG. 8 is a block diagram of an apparatus according to one embodiment.

FIG. 8 is a block diagram of an apparatus 801 for implementing an ingress point or an egress point (e.g., for implementing network node 206, UE 202, TT 601, TT 607), according to some embodiments. As shown in FIG. 8, apparatus 801 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a first communications interface 848 comprising a transmitter (Tx) 845 and a receiver (Rx) 847 for enabling apparatus 801 to transmit data to and receive data from other nodes connected to a network 110 (e.g., an Internet Protocol (IP) network) to which interface 848 is connected; a second communications interface 850 comprising a transmitter (Tx) 851 and a receiver (Rx) 852 for enabling apparatus 801 to transmit data to and receive data from other nodes connected to a network 111 to which interface 850 is connected; and a local storage unit (a.k.a., "data storage system") 808, which may include one or more non-volatile storage devices and/or one or more volatile storage devices. In embodiments in which apparatus 801 implements a UE, interface 850 may be coupled to an antenna enabling apparatus 801 to wirelessly transmit data to an access point (e.g., base station) within network 111. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 801 to perform steps described herein (e.g., steps described herein with reference to the flow charts). In other embodiments, apparatus 801 may be configured to perform steps described herein without the need for code. That is, for example, PC 802 may consist merely of one or more ASICs. Hence, the features of the embodiments described herein may be implemented in hardware and/or software.

Figure 10A:
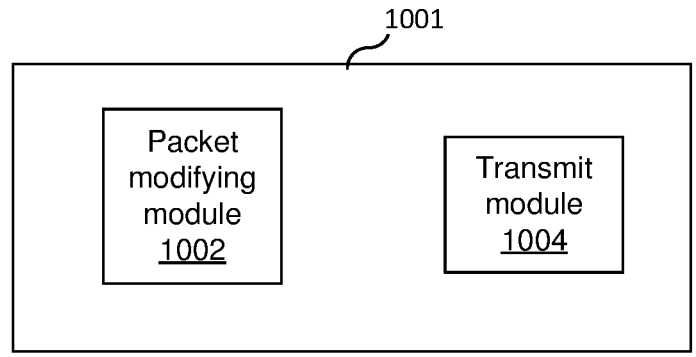
FIG. 10A is a functional block diagram of an ingress point according to an embodiment.

FIG. 10A is a functional block diagram of an ingress point 1001 according to an embodiment. In the embodiment shown, ingress point 1001 includes: packet modifying module 1002 configured to create a modified packet based on a received packet, wherein the modified packet includes the received packet and a slot identifier indicating a particular time slot in which the packet was received; and a transmit module 1004 configured to employ a transmitter to transmit the modified packet towards an egress point of the communication network. Modules 1002 and 1004 may be modules of computer program 843.

Figure 10B:
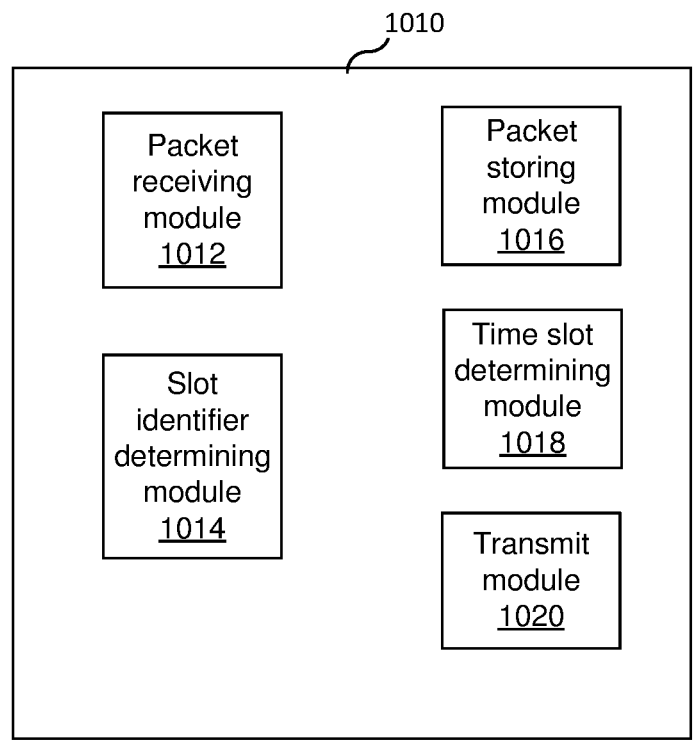
FIG. 10B is a functional block diagram of an egress point according to an embodiment.

FIG. 10B is a functional block diagram of an egress point 1010. In the embodiment shown, ingress point 1010 includes: a packet receiving module 1012 configured to receive a packet that was transmitted by an ingress point of the communication network, wherein the received packet comprises a packet that was received at the ingress point and a slot identifier; a slot identifier determining module 1014 configured to determine the slot identifier included in the received packet; a packet storing module 1016 configured to store in a transmit buffer the received packet or a modified version of the received packet; a time slot determining module 1018 configured to determine, based on the slot identifier, a time at which to transmit the received or modified packet towards an end-host; and a transmit module 1020 configured to employ a transmitter to transmit the received or modified packet at the determined time.

Embodiments

A1. A method (400) for use in avoiding jitter in a communication network, the method comprising: an ingress point of the communication network receiving (s402) a packet, wherein the packet is received at the ingress point at a time within a particular time slot; the ingress point creating (s404) a modified packet that includes the received packet and a slot identifier indicating the particular time slot in which the packet was received; and the ingress point transmitting (s406) the modified packet towards an egress point of the communication network.

A2. The method of embodiment A1, wherein the ingress point creates the modified packet by adding a tag to the packet, wherein the tag comprises the slot identifier.

A3. The method of embodiment A2, wherein the received packet is an Ethernet frame and the tag is an Ethernet Redundancy tag (R-TAG).

A4. The method of embodiment A3, wherein the R-TAG consists of six octets and the slot identifier is contained within the last two octets of the R-TAG.

A5. The method of any one of embodiments A1-A4, further comprising the ingress point, during at least a period of time, incrementing a slot counter value every T units of time, wherein T represents an amount of time between slots.

A6. The method of embodiment A5, wherein the slot identifier is the value of the slot counter at the time the ingress point received the packet.

A7. The method of embodiment A6, further comprising the ingress point initializing the slot counter value to an initial value at a predetermined ingress slot open time and thereafter increments the slot counter value every T units of time.

A8. The method of embodiment A6, wherein the packet is part of a particular packet stream and the method further comprises the ingress point initializing the slot counter value to an initial value in response to receiving the first packet of the particular packet stream.

B1. A method (500) for avoiding jitter in a communication network, the method comprising: an egress point of the communication network receiving (s502) a packet that was transmitted by an ingress point of the communication network, wherein the received packet comprises a packet that was received at the ingress point and a slot identifier; the egress point determining (s504) the slot identifier included in the received packet; the egress point storing (s506) in a transmit buffer the received packet or a modified version of the received packet; the egress point determining (s508), based on the slot identifier, a time at which to transmit the received or modified packet towards an end-host; and the egress point transmitting (s510) the received or modified packet at the determined time.

B2. The method of embodiment B1, further comprising the egress point removing (s505) the slot identifier from the received packet, thereby creating the modified packet, which modified version is identical to the packet that was received at the ingress point.

B3. The method of embodiment B1 or B2, wherein the received packet comprises a tag that contains the slot identifier.

B4. The method of embodiment B3, wherein the step of removing the slot identifier from the received packet comprises removing the tag from the modified packet.

B5. The method of embodiment B3 or B4, wherein the received packet is an Ethernet frame and the tag is an R-TAG.

B6. The method of embodiment B5, wherein the R-TAG consists of six octets and the slot identifier is contained within the last two octets of the R-TAG.

B7. The method of any one of embodiments B1-B6, further comprising the egress point, during at least a period of time, incrementing a slot counter value every T units of time, wherein T represents an amount of time between slots.

B8. The method of embodiment B7, further comprising the egress point initializing the slot counter value to an initial value at a predetermined egress slot open time and thereafter increments the slot counter value every T units of time.

C1. An ingress point of a communication network, the ingress point being configured to: create a modified packet based on a received packet, wherein the modified packet includes the received packet and a slot identifier indicating a particular time slot in which the packet was received; and transmit the modified packet towards an egress point of the communication network.

C2. The ingress point embodiment C1, wherein the ingress point is further adapted to perform the method of any one of embodiments A2-A8.

D1. An egress point in a communication network, the egress point being adapted to: receive a packet that was transmitted by an ingress point of the communication network, wherein the received packet comprises a packet that was received at the ingress point and a slot identifier; determine the slot identifier included in the received packet; store in a transmit buffer the received packet or a modified version of the received packet; determine, based on the slot identifier, a time at which to transmit the received or modified packet towards an end-host; and transmit the received or modified packet at the determined time.

D2. The egress point embodiment D1, wherein the ingress point is further adapted to perform the method of any one of embodiments B2-B8.

E1. An ingress point (1001) of a communication network, the ingress point comprising: packet modifying module (1002) configured to create a modified packet based on a received packet, wherein the modified packet includes the received packet and a slot identifier indicating a particular time slot in which the packet was received; and a transmit module (1004) configured to employ a transmitter to transmit the modified packet towards an egress point of the communication network.

F1. An egress point (1010) in a communication network, the egress point comprising: a packet receiving module (1012) configured to receive a packet that was transmitted by an ingress point of the communication network, wherein the received packet comprises a packet that was received at the ingress point and a slot identifier; a slot identifier determining module (1014) configured to determine the slot identifier included in the received packet; a packet storing module (1016) configured to store in a transmit buffer the received packet or a modified version of the received packet; a time slot determining module (1018) configured to determine, based on the slot identifier, a time at which to transmit the received or modified packet towards an end-host; and a transmit module (1020) configured to employ a transmitter to transmit the received or modified packet at the determined time.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for use in avoiding jitter in a communication network, the method comprising:
   an ingress point of the communication network receiving packets of a packet stream, wherein the packets are to be delivered with an agreed fixed latency and each packet is received at the ingress point at a time within a particular time slot;
   the ingress point, during at least a period of time, incrementing a slot counter value every T units of time, wherein T represents an amount of time between slots;
   for each of the received packets, the ingress point creating a modified packet that includes the received packet and a slot identifier indicating the particular time slot in which the packet was received, wherein the slot identifier is the value of the slot counter at the time the ingress point received the packet; and
   the ingress point transmitting the modified packets towards an egress point of the communication network, wherein the ingress point and the egress point share the same value of T for incrementing the slot counter value.

2. The method of claim 1, wherein creating the modified packet comprises adding a tag to the packet, wherein the tag comprises the slot identifier.

3. The method of claim 2, wherein the received packet is an Ethernet frame and the tag is an Ethernet Redundancy tag (R-TAG).

4. The method of claim 3, wherein the R-TAG consists of six octets and the slot identifier is contained within the last two octets of the R-TAG.

5. The method of claim 1, further comprising the ingress point initializing the slot counter value to an initial value at a predetermined ingress slot open time and thereafter increments the slot counter value every T units of time.

6. The method of claim 1, further comprising the ingress point initializing the slot counter value to an initial value in response to receiving the first packet of the particular packet stream.

7. A method for avoiding jitter in a communication network, the method comprising:
   an egress point of the communication network receiving packets of a packet stream that were transmitted by an ingress point of the communication network, wherein each received packet is to be delivered with an agreed fixed latency, and each received packet comprises a packet that was received at the ingress point and a slot identifier indicating a particular time slot in which the packet was received by the ingress point;

the egress point, during at least a period of time, incrementing a slot counter value every T units of time, wherein T represents an amount of time between slots, wherein the ingress point and the egress point share the same value of T for incrementing the slot counter value;

for each of the received packets, the egress point determining the slot identifier included in the received packet;

for each of the received packets, the egress point storing in a transmit buffer the received packet or a modified version of the received packet, the modified version being generated by removing the slot identifier from the received packet;

for each of the received packets, the egress point determining, based on the slot identifier included in the received packet, a time at which to transmit the received or modified packet towards an end-host; and for each of the received packets, the egress point transmitting the received or modified packet at the determined time.

8. The method of claim 7, further comprising the egress point removing the slot identifier from the received packet, thereby creating the modified version, which modified version is identical to the packet that was received at the ingress point.

9. The method of claim 7, wherein the received packet comprises a tag that contains the slot identifier.

10. The method of claim 9, wherein removing the slot identifier from the received packet comprises removing the tag from the received packet.

11. The method of claim 9, wherein the received packet is an Ethernet frame and the tag is an Ethernet Redundancy tag (R-TAG).

12. The method of claim 11, wherein the R-TAG consists of six octets and the slot identifier is contained within the last two octets of the R-TAG.

13. The method of claim 7, further comprising the egress point initializing the slot counter value to an initial value at a predetermined egress slot open time and thereafter increments the slot counter value every T units of time.

14. A non-transitory computer readable medium storing a computer program comprising instructions which when executed by processing circuitry of a network node causes the network node to perform the method of claim 1.

15. An ingress point of a communication network, the ingress point comprising:
memory; and
processing circuitry coupled to the memory, wherein the ingress points is configured to:
for each received packet of a packet stream, wherein each packet is to be delivered with an agreed fixed latency, create a modified packet based on the received packet, wherein the modified packet includes the received packet and a slot identifier indicating a particular time slot in which the packet was received; and during at least a period of time, increment a slot counter value every T units of time, wherein T represents an amount of time between slots, wherein the slot identifier is the value of the slot counter at the time the ingress point received the packet;

transmit the modified packet towards an egress point of the communication network, wherein the ingress point and the egress point share the same value of T for incrementing the slot counter value.

16. The ingress point of claim 15, wherein the ingress point is configured to create the modified packet by adding a tag to the packet, wherein the tag comprises the slot identifier.

17. An egress point in a communication network, the egress point comprising;
memory; and
processing circuitry coupled to the memory, wherein the ingress points is configured to:
receive packets of a packet stream that were transmitted by an ingress point of the communication network, wherein each received packet is to be delivered with an agreed fixed latency, and each received packet comprises a packet that was received at the ingress point and a slot identifier;

during at least a period of time, increment a slot counter value every T units of time, wherein T represents an amount of time between slots, wherein the ingress point and the egress point share the same value of T for incrementing the slot counter value;

for each of the received packets, determine the slot identifier included in the received packet;

for each of the received packets, store in a transmit buffer the received packet or a modified version of the received packet, the modified version being generated by removing the slot identifier from the received packet;

for each of the received packets, determine, based on the slot identifier included in the received packet, a time at which to transmit the received or modified packet towards an end-host; and for each of the received packets, transmit the received or modified packet at the determined time.

18. The egress point of claim 17, wherein the egress point is further configured to remove the slot identifier from the received packet, thereby creating the modified version, which modified version is identical to the packet that was received at the ingress point.

19. A system in a communication network comprising:
processing circuitry; and
a memory, said memory containing instructions executable by said processing circuitry, wherein said system is configured to perform the method of claim 1.

* * * * *